United States Patent
Kim et al.

(10) Patent No.: US 10,344,836 B2
(45) Date of Patent: Jul. 9, 2019

(54) VEHICLE TRANSMISSION

(71) Applicants: HYUNDAI MOTOR COMPANY, Seoul (KR); KIA Motors Corporation, Seoul (KR)

(72) Inventors: Ki Tae Kim, Incheon (KR); Seong Wook Hwang, Gunpo-si (KR); Hyun Sik Kwon, Seoul (KR); Won Min Cho, Hwaseong-si (KR); Jae Chang Kook, Hwaseong-si (KR); Seong Wook Ji, Gunpo-si (KR)

(73) Assignees: HYUNDAI MOTOR COMPANY, Seoul (KR); KIA Motors Corporation, Seoul (KR)

( * ) Notice: Subject to any disclaimer, the term of this patent is extended or adjusted under 35 U.S.C. 154(b) by 9 days.

(21) Appl. No.: 15/831,007

(22) Filed: Dec. 4, 2017

(65) Prior Publication Data
US 2019/0024759 A1   Jan. 24, 2019

(30) Foreign Application Priority Data
Jul. 18, 2017   (KR) .................. 10-2017-0090858

(51) Int. Cl.
*F16H 3/66* (2006.01)

(52) U.S. Cl.
CPC ..... *F16H 3/666* (2013.01); *F16H 2200/0069* (2013.01); *F16H 2200/202* (2013.01); *F16H 2200/2015* (2013.01); *F16H 2200/2023* (2013.01); *F16H 2200/2046* (2013.01)

(58) Field of Classification Search
None
See application file for complete search history.

(56) References Cited

U.S. PATENT DOCUMENTS

| | | | | |
|---|---|---|---|---|
| 9,279,479 B1* | 3/2016 | Hwang | .................. | F16H 3/66 |
| 2008/0280721 A1* | 11/2008 | Seo | ................. | F16H 3/663 475/276 |
| 2013/0150204 A1* | 6/2013 | Park | .................. | F16H 3/666 475/276 |
| 2016/0116026 A1* | 4/2016 | Muller | ................. | F16H 3/666 475/269 |
| 2016/0169349 A1* | 6/2016 | Park | .................. | F16H 3/666 475/275 |
| 2016/0169350 A1* | 6/2016 | Park | .................. | F16H 3/666 475/275 |

(Continued)

FOREIGN PATENT DOCUMENTS

KR   20130003981 A   1/2013

*Primary Examiner* — Justin Holmes
(74) *Attorney, Agent, or Firm* — McDonnell Boehnen Hulbert & Berghoff LLP

(57) ABSTRACT

Disclosed is a vehicle transmission capable of improving fuel economy and performance of a vehicle with an increased number of gear stages. The vehicle transmission includes three simple planetary gear sets and one compound planetary gear set or includes five simple planetary gear sets. A shifting operation is performed by changing speed and direction of rotation of gears in a manner of selectively connecting and disconnecting rotary elements of the gear sets and a plurality of friction members. The vehicle transmission provides ten or more forward speed ratios and one or more reverse speed ratios through this shifting operation.

10 Claims, 3 Drawing Sheets

(56) References Cited

U.S. PATENT DOCUMENTS

| | | | |
|---|---|---|---|
| 2016/0169351 A1* | 6/2016 | Lee .................. | F16H 3/666 |
| | | | 475/275 |
| 2016/0169352 A1* | 6/2016 | Lee .................. | F16H 3/666 |
| | | | 475/275 |
| 2018/0363736 A1* | 12/2018 | Kim .................. | F16H 3/666 |
| 2018/0363737 A1* | 12/2018 | Kook ................ | F16H 3/666 |
| 2019/0017574 A1* | 1/2019 | Kim .................. | F16H 3/66 |

* cited by examiner

FIG. 3

|    | B1 | B2 | C1 | C2 | C3 | C4 | SPEED |
|----|----|----|----|----|----|----|-------|
| 1  | ●  | ●  | ●  |    |    |    | 4.600 |
| 2  | ●  | ●  |    |    |    | ●  | 2.864 |
| 3  |    | ●  | ●  |    |    | ●  | 1.971 |
| 4  |    | ●  |    | ●  |    | ●  | 1.642 |
| 5  |    | ●  | ●  | ●  |    |    | 1.441 |
| 6  |    | ●  | ●  |    | ●  |    | 1.236 |
| 7  |    |    | ●  | ●  | ●  |    | 1.000 |
| 8  | ●  |    | ●  |    | ●  |    | 0.845 |
| 9  | ●  |    | ●  | ●  |    |    | 0.678 |
| 10 | ●  |    |    | ●  | ●  |    | 0.623 |
| R  | ●  | ●  |    |    | ●  |    | 4.533 |

VEHICLE TRANSMISSION

CROSS REFERENCE TO RELATED APPLICATION

The present application claims priority to Korean Patent Application No. 10-2017-0090858, filed Jul. 18, 2017, the entire contents of which is incorporated herein by reference.

BACKGROUND

Technical Field

The present disclosure generally relates to a vehicle transmission having an increased number of gear stages, providing for improved fuel economy and vehicle performance.

Description of the Related Art

Recent increases in oil prices have triggered attempted improvements in fuel economy of vehicles. Especially with regards to the engine of a vehicle, research has focused on weight reduction to improve fuel economy through downsizing.

It is possible to improve both fuel economy and performance of a vehicle by increasing the number of gear stages in an automatic transmission.

However, as the number of gear stages increases, the number of parts constituting a transmission correspondingly increases, which is likely to deteriorate mountability and overall transmission efficiency and to increase raw material costs and weight of the transmission.

The foregoing is intended merely to aid in the understanding of the background of the present disclosure, and is not intended to mean that the present disclosure falls within the purview of the related art that is already known to those skilled in the art.

SUMMARY

Accordingly, the present disclosure addresses the above problems by providing a vehicle transmission that can improve fuel economy and performance of a vehicle with an increased number of gear stages.

In order to accomplish the above object, the present disclosure provides a vehicle transmission including: a first planetary gear set; a second planetary gear set; a third planetary gear set; a compound planetary gear set, wherein each gear set comprises three or more rotary elements; and a plurality of friction members, each connected to at least one of the rotary elements and controlling rotation of the at least one rotary elements connected thereto, wherein: the first planetary gear set includes a first rotary element directly connected to a first rotary element of the second planetary gear set and a second rotary element directly connected to a fourth rotary element of compound planetary gear set; the second planetary gear set includes a second rotary element directly connected to an input shaft; the third planetary gear set includes a second rotary element directly connected to a third rotary element of the compound planetary gear set and a third rotary element directly connected to a second rotary element of the compound planetary gear set; and the compound planetary gear set includes the second rotary element directly connected to an output shaft.

The first planetary gear set may further include a first rotary element operated selectively as a fixed element by a friction member; a second rotary element selectively connected to a third rotary element of the second planetary gear set by a friction member; and a third rotary element operated selectively as a fixed element by a friction member; and the second planetary gear set may further include a second rotary element selectively connected to a first rotary element of the compound planetary gear set by a friction member, and a third rotary element selectively connected to a first rotary element of the third planetary gear set by a friction member and with the first rotary element of the compound planetary gear set.

The first, second, and third planetary gear sets may include respective sun gears serving as the respective first rotary elements, respective carriers serving as the respective second rotary elements, and respective ring gears serving as the respective third rotary elements. The compound planetary gear set may include a sun gear serving as the first rotary element, a carrier serving as the second rotary element, and two ring gears that respectively serve as the third rotary element and the fourth rotary element and both of which are engaged with the carrier.

The compound planetary gear set may include a fourth planetary gear set and a fifth planetary gear set; the first rotary element of the compound planetary gear set may include a sun gear of the fourth planetary gear set and a sun gear of the fifth planetary gear set, which are directly connected to each other; the second rotary element of the compound planetary gear set may include a carrier of the fourth planetary gear set and a carrier of the fifth planetary gear set, which are directly connected to each other; the third rotary element of the compound planetary gear set may be a ring gear of the fourth planetary gear set; and the fourth rotary element of the compound planetary gear set may be a ring gear of the fifth planetary gear set.

The friction members may include: a first brake disposed between the sun gear of the first planetary gear set and a transmission case; a second brake disposed between the first ring gear of first planetary gear set and the transmission case; a first clutch disposed between the carrier of the second planetary gear set and the sun gear of the fifth planetary gear set; a second clutch disposed between the carrier of the first planetary gear set and the ring gear of the second planetary gear set; a third clutch disposed between the ring gear of the second planetary gear set and the sun gear of the third planetary gear set; and a fourth clutch disposed between the ring gear of the second planetary gear set and the sun gear of the fifth planetary gear set.

The friction members may include: a first brake disposed between the first rotary element of the first planetary gear set and a transmission case; a second brake disposed between the third rotary element of the first planetary gear set and the transmission case; a first clutch disposed between the second rotary element of the second planetary gear set and the first rotary element of the compound planetary gear set; a second clutch disposed between the second rotary element of the first planetary gear set and the third rotary element of the second planetary gear set; a third clutch disposed between the third rotary element of the second planetary gear set and the first rotary element of the third planetary gear set; and a fourth clutch disposed between the third rotary element of the second planetary gear set and the first rotary element of the compound planetary gear set.

In order to achieve the objective, according to another aspect, a vehicle transmission is provided, including: a first planetary gear set, a second planetary gear set, a third planetary gear set, and a compound planetary gear, each including three or more rotary elements; an input shaft connected to a second rotary element of the second planetary gear set and a first clutch; a first shaft connected to a first brake, a first rotary element of the first planetary gear set, and a first rotary element of the second planetary gear set; a second shaft connected to a second brake and a third rotary element of the first planetary gear set; a third shaft connected to a second rotary element of the first planetary gear set, a second clutch, and a fourth rotary element of the compound planetary gear set; a fourth shaft connected to a third rotary element of the second planetary gear set, the second clutch, a third clutch, and a fourth clutch; a fifth shaft connected to the third clutch, and a first rotary element of the third planetary gear set; a sixth shaft connected to a second rotary element of the third planetary gear set and a third rotary element of the compound planetary gear set; a seventh shaft connected to the first clutch, the fourth clutch, and a first rotary element of the compound planetary gear set; and an output shaft connected to a third rotary element of the third planetary gear set and a second rotary element of the compound planetary gear set.

The first brake may be disposed between the first shaft and a transmission case; the second brake may be disposed between the second shaft and the transmission case; the first clutch may be disposed between the input shaft and the seventh shaft; the second clutch may be disposed between the third shaft and the fourth shaft; the third clutch may be disposed between the fourth shaft and the fifth shaft; and the fourth clutch may be disposed between the fourth shaft and the seventh shaft.

The first brake may be disposed between the first rotary element of the first planetary gear set and the transmission case; the second brake may be disposed between the third rotary element of the first planetary gear set and the transmission case; the first clutch may be disposed between the second rotary element of the second planetary gear set and the first rotary element of the compound planetary gear set; the second clutch may be disposed between the second rotary element of the first planetary gear set and the third rotary element of the second planetary gear set; the third clutch may be disposed between the third rotary element of the second planetary gear set and the first rotary element of the third planetary gear set; and the fourth clutch may be disposed between the third rotary element of the second planetary gear set and the first rotary element of the compound planetary gear set.

As described above, the vehicle transmission includes three simple planetary gear sets and one compound planetary gear set or includes five simple planetary gear sets. With this structure, a shifting operation is performed by changing speed and direction of rotation of gears in the manner of selectively connecting and disconnecting rotary elements of the planetary gear sets and a plurality of friction members. Thus, the vehicle transmission can provide ten or more forward speed ratios and one or more reverse speed ratios through this shifting operation. Therefore, the vehicle transmission with multiple gear stages can improve fuel economy and performance of a vehicle. Furthermore, the embodiments of the present disclosure have an effect of improving drive comfort by using operating points or power generating points in a low revolutions per minute (RPM) range (e.g., below 2,000 RPM) of an engine.

BRIEF DESCRIPTION OF THE DRAWINGS

The above and other objects, features and other advantages of the present disclosure will be more clearly understood from the following detailed description when taken in conjunction with the accompanying drawings.

FIG. 3 is a table showing operation at each gear of the vehicle transmission of FIG. 1 according to the present disclosure.

DETAILED DESCRIPTION OF THE DISCLOSURE

Hereinbelow, exemplary embodiments of the present disclosure will be described in detail with reference to the accompanying drawings.

According to the present disclosure, a vehicle transmission comprises a first planetary gear set PG1, a second planetary gear set PG2, a third planetary gear set PG3, and a compound planetary gear set CPG, each of which includes three or more rotary elements.

Figure 1:
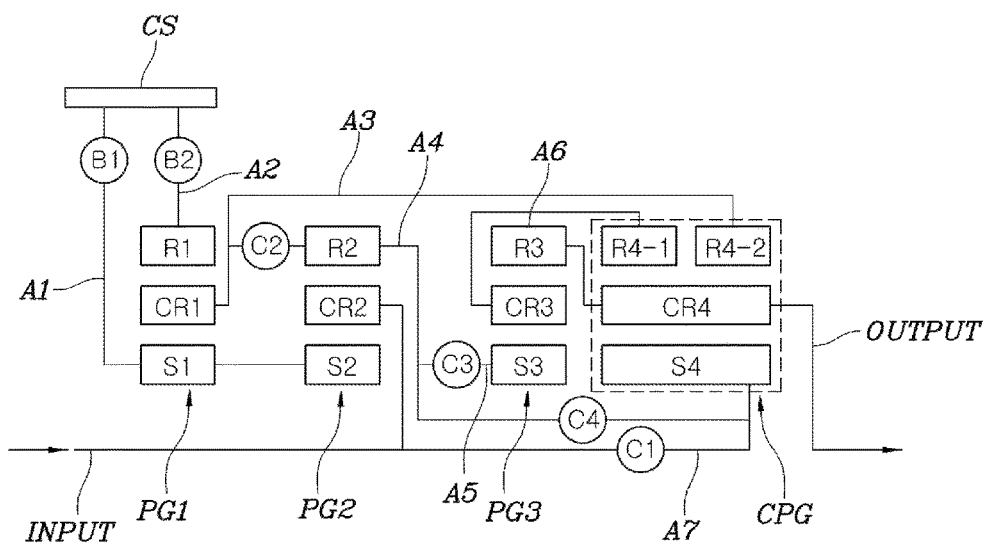
FIG. 1 is a diagram illustrating an example structure of a vehicle transmission according to the present disclosure.
Figure 2:
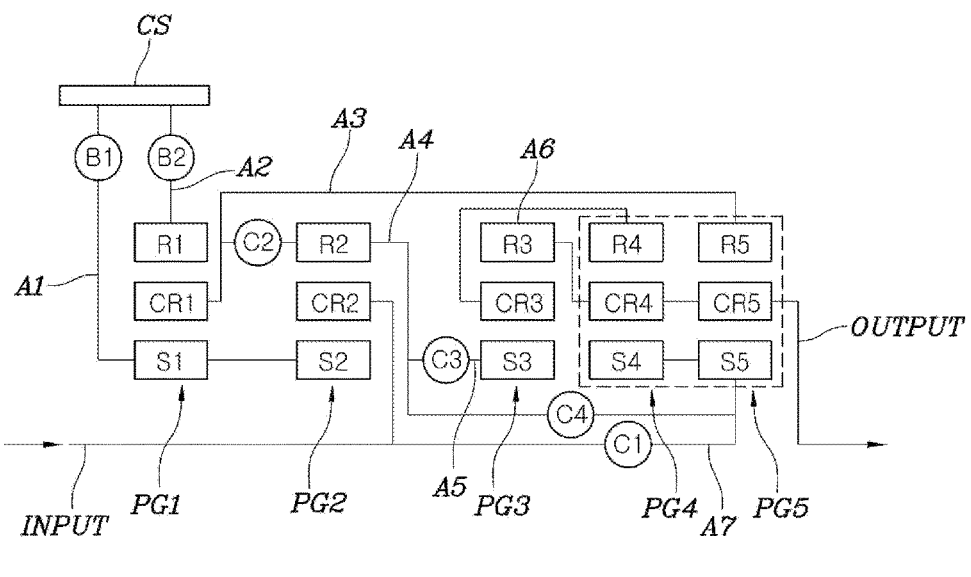
FIG. 2 is a diagram illustrating an example modified structure of a compound planetary gear set shown in FIG. 1 according to the present disclosure.

FIGS. 1 and 2 are diagrams illustrating the structure of a vehicle transmission according to the present disclosure. Referring to the example embodiments of FIGS. 1 and 2, a first rotary element of the first planetary gear set PG1 operates selectively as a fixed element and is directly connected to a first rotary element of the second planetary gear set PG2.

For example, the first rotary element of the first planetary gear set PG1 may be a first sun gear S1. The first sun gear S1 may be disposed to a transmission case (CS) by a friction member. In the example embodiment of FIG. 1, the friction members are a first brake B1, a second brake B2, a first clutch C1, a second clutch C2, a third clutch C3, and a fourth clutch C4.

The first rotary element of the second planetary gear set PG2 may be a second sun gear S2. The first sun gear S1 and the second sun gear S2 may be directly connected with each other.

All of the first planetary gear set PG1, the second planetary gear set PG2, and a third planetary gear set PG3 which are described below are single pinion planetary gears. As to the first planetary gear set PG1, the second planetary gear set PG2, and the third planetary gear set PG3, first rotary elements are respectively the first sun gear, the second gear, and a third sun gear; second rotary elements are respectively a first carrier, a second carrier, and a third carrier; and third rotary elements are respectively a first ring gear, a second ring gear, and a third ring gear.

The second rotary element of the first planetary gear set PG1 is selectively connected to the third rotary element of the second planetary gear set and with a fourth rotary element of the compound planetary gear set CPG.

For example, the second rotary element of the first planetary gear set PG1 may be the first carrier CR1, and the third rotary element of the second planetary gear set PG2 may be the second ring gear R2, in which the first carrier CR1 and the second ring gear R2 may be disposed to each other by a friction member.

The fourth rotary element of the compound planetary gear set CPG may be a second fourth ring gear R4-2 as illustrated in the example embodiment of FIG. 1 or a fourth ring gear R4 as illustrated in the example embodiment of FIG. 2. The first carrier CR1 and the second fourth ring gear are directly connected to each other, or the first carrier CR1 and the fourth ring gear R4 may be directly connected to each other.

The structure of the compound planetary gear set CPG will be described. As illustrated in FIG. 1, the compound planetary gear set CPG may be composed of one compound planetary gear set CPG. Alternatively, as illustrated in the example embodiment of FIG. 2, the compound planetary gear set CPG may be composed of two planetary gear sets.

In the example embodiment of FIG. 1, in the compound planetary gear set CPG, a first rotary element is a fourth sun gear S4, a second rotary element is a fourth carrier CR4, and a third rotary element and a fourth rotary element may be respectively a first fourth ring gear R4-1 and the second fourth ring gear R4-2, both of which are engaged with the fourth carrier.

In the example embodiment of FIG. 2, the compound planetary gear set CPG is composed of a fourth planetary gear set PG4 and a fifth planetary gear set PG5, both of which are single pinion gear sets.

That is, a first rotary element of the compound planetary gear set CPG may include a fourth sun gear S4 of the fourth planetary gear set PG4 and a fifth sun gear S5 of the fifth planetary gear set PG5, which are directly connected to each other.

A second rotary element of the compound planetary gear set CPG may include a fourth carrier CR4 of the fourth planetary gear set PG4 and a fifth carrier CR5 of the fifth planetary gear set, which are directly connected to each other.

A third rotary element of the compound planetary gear set CPG may be a fourth ring gear R4 of the fourth planetary gear set PG4, and a fourth rotary element of the compound planetary gear set CPG may be a fifth ring gear R5 of the fifth planetary gear set PG5.

The third rotary element of the first planetary gear set PG1 may operate as a fixed element.

For example, the third rotary element of the first planetary gear set PG1 may be the first ring gear R1, in which the first ring gear R1 may be disposed to the transmission case CS by a friction member.

Still referring to the example embodiments of FIGS. 1 and 2, the second rotary element of the second planetary gear set PG2 may be directly connected to an input shaft INPUT, and may be selectively connected to the first rotary element of the compound planetary gear set CPG.

For example, the second rotary element of the second planetary gear set PG2 may be the second carrier CR2, in which the second carrier CR2 may be directly connected to the input shaft INPUT, thereby operating normally as an input element.

The first rotary element of the compound planetary gear set CPG may be the fourth sun gear S4 in the example embodiment of FIG. 1, and the second carrier CR2 and the fourth sun gear S4 may be disposed to each other by a friction member. In the example of FIG. 2, the first rotary element of the compound planetary gear set CPG may be the fifth sun gear S5, in which the second carrier CR2 and the fifth sun gear S5 may be disposed to each other by a friction member.

The third rotary element of the second planetary gear set PG2 may be selectively connected to the first rotary element of the third planetary gear set PG3, or selectively connected to the first rotary element of the compound planetary gear set CPG.

For example, the third rotary element of the second planetary gear set PG2 may be the second ring gear R2, the first rotary element of the third planetary gear set PG3 may be the third sun gear S3, and the second ring gear R2 and the third sun gear S3 may be disposed to each other by a friction member.

In the example embodiment of FIG. 1, the first rotary element of the compound planetary gear set CPG may be the fourth sun gear S4, and the second ring gear R2 and the fourth sun gear S4 may be disposed to each other by a friction member. In the example of FIG. 2, the first rotary element of the compound planetary gear set CPG may be the fifth sun gear S5, and the second ring gear R2 and the fifth sun gear S5 may be disposed to each other by a friction member.

The second rotary element of the third planetary gear set PG3 may be directly connected to the third rotary element of the compound planetary gear set CPG.

For example, the second rotary element of the third planetary gear set PG3 may be the third carrier CR3, the third rotary element of the compound planetary gear set CPG may be the first fourth ring gear R4-1 in the example embodiment of FIG. 1, and the third carrier CR3 and the first fourth ring gear R4-1 may be directly connected to each other. In the example embodiment of FIG. 2, the third rotary element of the compound planetary gear set may be the fourth ring gear R4, and the third carrier CR3 and the fourth ring gear R4 may be directly connected to each other.

The third rotary element of the third planetary gear set PG3 may be directly connected to the second rotary element of the compound planetary gear set CPG.

For example, the third rotary element of the third planetary gear set PG3 may be the third ring gear R3, and the second rotary element of the compound planetary gear set CPG may be the fourth carrier CR4, in which the third ring gear R3 and the fourth carrier CR4 may be directly connected to each other.

The second rotary element of the compound planetary gear set CPG may be directly connected to an output shaft OUTPUT.

For example, the fourth carrier CR4 may be directly connected to the output shaft OUTPUT as illustrated in FIG. 1, and the fifth carrier CR5 may be directly connected to the output shaft OUTPUT as illustrated in the example embodiment of FIG. 2.

In the vehicle transmission having the structure described above, the first planetary gear set PG1, the second planetary gear set PG2, the third planetary gear set PG3, and the compound planetary gear set CPG are arranged in the above-described order in the axial direction of the input shaft INPUT and the output shaft OUTPUT.

The vehicle transmission may further include a plurality of friction members connected with at least one of the rotary elements of the planetary gear sets, thereby controlling rotation of at least one of the rotary elements. The friction members are a first brake B1, a second brake B2, a first clutch C1, a second clutch C2, a third clutch C3, and a fourth clutch C4.

Specifically, the first brake B1 may be disposed between the first sun gear S1 and the transmission case CS, where the first sun gear S1 may serve as the first rotary element of the first planetary gear set PG1.

The second brake B2 may be disposed between the first ring gear R1 serving as the third rotary element of the first planetary gear set PG1 and the transmission case CS.

The first clutch C1 may be disposed between the second carrier CR2 serving as the second rotary element of the second planetary gear set PG2, and either the fourth sun gear S4, as shown in the example embodiment of FIG. 1, or serving as the first rotary element of the compound planetary gear set CPG or the fifth sun gear S5, as shown in the example embodiment of FIG. 2.

The second clutch C2 may be disposed between the first carrier CR1 serving as the second rotary element of the first planetary gear set PG1, and the second ring gear R2 serving as the third rotary element of the second planetary gear set PG2.

The third clutch C3 may be disposed between the second ring gear R2 serving as the third rotary element of the second planetary gear set PG2, and the first sun gear S3 serving as the first rotary element of the third planetary gear set PG3.

The fourth clutch C4 may be disposed between the second ring gear R2 serving as the third rotary element of the second planetary gear set PG2, and either the fourth sun gear S4, as shown in the example embodiment of FIG. 1, or serving as the first rotary element of the compound planetary gear set CPG or the fifth sun gear S5, as shown in the example embodiment of FIG. 2.

The vehicle transmission of the present disclosure may be constructed by connecting the rotary elements of the planetary gear sets and the friction members with the input shaft INPUT, first to seventh shafts A1 to A7, and the output shaft OUTPUT.

As shown in the example embodiments of FIGS. 1 and 2, the input shaft INPUT may be connected to the second rotary element of the second planetary gear set PG2 and a first end of the first clutch C1.

The first shaft A1 may be connected to the first brake B1, the first rotary element of the first planetary gear set PG1, and the first rotary element of the second planetary gear set PG2.

The second shaft A2 may be connected to the second brake B2 and the third rotary element of the first planetary gear set PG1.

The third shaft A3 may be connected to the second rotary element of the first planetary gear set PG1, a first end of the second clutch C2, and the fourth rotary element of the compound planetary gear set CPG.

The fourth shaft A4 may be connected to the third rotary element of the second planetary gear set PG2, a second end of the second clutch C2, a first end of the third clutch C3, and a first end of the fourth clutch C4.

The fifth shaft A5 may be connected to a first end of the third clutch C3 and the first rotary element of the third planetary gear set PG3.

The sixth shaft A6 may be connected to the second rotary element of the third planetary gear set PG3 and the third rotary element of the compound planetary gear set CPG.

The seventh shaft A7 may be connected to a second end of the first clutch C1, a second end of the fourth clutch C4, and the first rotary element of the compound planetary gear set CPG.

The output shaft OUTPUT may be connected to the third rotary element of the third planetary gear set PG3 and the second rotary element of the compound planetary gear set CPG.

The transmission case CS may be connected to the first brake B1 and the second brake B2.

For example, the first brake B1 may be disposed between the first shaft A1 and the transmission case CS, the second brake B2 may be disposed between the second shaft A2 and the transmission case CS, and the first clutch may be disposed between the input shaft INPUT and the seventh shaft A7.

The second clutch C2 may be disposed between the third shaft A3 and the fourth shaft A4, the third clutch C3 may be disposed between the fourth shaft A4 and the fifth shaft A5, and the fourth clutch C4 may be disposed between the fourth shaft A4 and the seventh shaft A7.

FIG. 3 is a table showing operation at each gear of the vehicle transmission of the present disclosure, in which the first brake B1, the second brake B2, and the first clutch C1 are connected to each other and the other friction members are disconnected to implement a first gear ratio.

In order to implement a second gear ratio, the first brake B1, the second brake B2, and the fourth clutch C4 are connected to each other and the other friction members are disconnected. The other gear ratios can be implemented through selective connection and disconnection of the friction members as in the operation table shown in FIG. 3.

As described above, the vehicle transmission of the present disclosure is constructed by combining three simple planetary gear sets, such as PG1, PG2, and PG3, for example, and one compound planetary gear set CPG or by combining five simple planetary gear sets. With this structure, a shifting operation is performed by changing speed and direction of rotation of each gear through selective connection and disconnection of the rotary elements of the planetary gears and the friction members. The vehicle transmission provides ten or more forward speed ratios and one or more reverse speed ratios through this shifting operation. Accordingly, the vehicle transmission with multiple gear stages can improve not only fuel economy but also performance and drive comfort of a vehicle by using operating points or power generating points in a low RPM range (e.g., below 2,000 RPM) of an engine.

Although various embodiments have been described above, those skilled in the art will appreciate that various modifications, additions, and substitutions are possible, without departing from the scope and spirit of the disclosure as disclosed in the accompanying claims.

What is claimed is:

1. A vehicle transmission comprising:
  a first planetary gear set;
  a second planetary gear set;
  a third planetary gear set;
  a compound planetary gear set, wherein each of the first to third planetary gear sets comprises three rotary elements, and the compound planetary gear set comprises four rotary elements; and
  a plurality of friction members connected to at least one of the rotary elements and controlling rotation of the at least one of the rotary elements, wherein:
  the first planetary gear set comprises a first rotary element directly connected to a first rotary element of the second planetary gear set and a second rotary element directly connected to a fourth rotary element of the compound planetary gear set;
  the second planetary gear set comprises a second rotary element directly connected to an input shaft;
  the third planetary gear set comprises a second rotary element directly connected to a third rotary element of the compound planetary gear set and a third rotary element directly connected to a second rotary element of the compound planetary gear set; and
  the compound planetary gear set includes the second rotary element directly connected to an output shaft.

2. The vehicle transmission according to claim 1, wherein:
  the first planetary gear set further comprises a first rotary element selectively connected to a transmission case, a second rotary element selectively connected to a third rotary element of the second planetary gear set, and a third rotary element selectively connected to the transmission case; and
  the second planetary gear set further includes a second rotary element selectively connected to a first rotary element of the compound planetary gear set, and a third rotary element selectively connected to a first rotary element of the third planetary gear set and to the first rotary element of the compound planetary gear set.

3. The vehicle transmission according to claim 2, wherein:
the first planetary gear set, second planetary gear set, and third planetary gear set each includes a sun gear serving as the first rotary element, a carrier serving as the second rotary element, and a ring gear serving as the third rotary element; and
the compound planetary gear set includes a sun gear serving as the first rotary element, a carrier serving as the second rotary element, and two ring gears that serve as the third rotary element and the fourth rotary element and both being engaged with the carrier.

4. The vehicle transmission according to claim 3, wherein:
the compound planetary gear set comprises a fourth planetary gear set and a fifth planetary gear set;
the first rotary element of the compound planetary gear set comprises a sun gear of the fourth planetary gear set connected to a sun gear of the fifth planetary gear set;
the second rotary element of the compound planetary gear set comprises a carrier of the fourth planetary gear set connected to a carrier of the fifth planetary gear set;
the third rotary element of the compound planetary gear set is a ring gear of the fourth planetary gear set; and
the fourth rotary element of the compound planetary gear set is a ring gear of the fifth planetary gear set.

5. The vehicle transmission according to claim 4, wherein the friction members comprise:
a first brake disposed between the sun gear of the first planetary gear set and the transmission case;
a second brake disposed between the first ring gear of first planetary gear set and the transmission case;
a first clutch disposed between the carrier of the second planetary gear set and the sun gear of the fifth planetary gear set;
a second clutch disposed between the carrier of the first planetary gear set and the ring gear of the second planetary gear set;
a third clutch disposed between the ring gear of the second planetary gear set and the sun gear of the third planetary gear set; and
a fourth clutch disposed between the ring gear of the second planetary gear set and the sun gear of the fifth planetary gear set.

6. The vehicle transmission according to claim 2, wherein the friction members comprise:
a first brake disposed between the first rotary element of the first planetary gear set and a transmission case;
a second brake disposed between the third rotary element of the first planetary gear set and the transmission case;
a first clutch disposed between the second rotary element of the second planetary gear set and the first rotary element of the compound planetary gear set;
a second clutch disposed between the second rotary element of the first planetary gear set and the third rotary element of the second planetary gear set;
a third clutch disposed between the third rotary element of the second planetary gear set and the first rotary element of the third planetary gear set; and
a fourth clutch disposed between the third rotary element of the second planetary gear set and the first rotary element of the compound planetary gear set.

7. The vehicle transmission according to claim 2, wherein:
the first brake is disposed between the first rotary element of the first planetary gear set and the transmission case;
the second brake is disposed between the third rotary element of the first planetary gear set and the transmission case;
the first clutch is disposed between the second rotary element of the second planetary gear set and the first rotary element of the compound planetary gear set;
the second clutch is disposed between the second rotary element of the first planetary gear set and the third rotary element of the second planetary gear set;
the third clutch is disposed between the third rotary element of the second planetary gear set and the first rotary element of the third planetary gear set; and
the fourth clutch is disposed between the third rotary element of the second planetary gear set and the first rotary element of the compound planetary gear set.

8. A vehicle transmission comprising:
a first planetary gear set;
a second planetary gear set;
a third planetary gear set;
a compound planetary gear, wherein each of the first to third planetary gear sets comprises three rotary elements, and the compound planetary gear set comprises four rotary elements;
an input shaft connected to a second rotary element of the second planetary gear set;
a first shaft connected to a first rotary element of the first planetary gear set and a first rotary element of the second planetary gear set;
a second shaft connected to a third rotary element of the first planetary gear set;
a third shaft connected to a second rotary element of the first planetary gear set and a fourth rotary element of the compound planetary gear set;
a fourth shaft connected to a third rotary element of the second planetary gear set;
a fifth shaft connected to a first rotary element of the third planetary gear set;
a sixth shaft connected to a second rotary element of the third planetary gear set and a third rotary element of the compound planetary gear set;
a seventh shaft connected to a first rotary element of the compound planetary gear set; and
an output shaft connected to a third rotary element of the third planetary gear set and a second rotary element of the compound planetary gear set.

9. The vehicle transmission according to claim 8, wherein:
the first shaft is selectively connected to a transmission case;
the second shaft is selectively connected to the transmission case;
the seventh shaft is selectively connected to the input shaft;
the third shaft is selectively connected to the fourth shaft;
the fourth shaft is selectively connected to the fifth shaft; and
the fourth shaft is selectively connected to the seventh shaft.

10. The vehicle transmission according to claim 9, wherein:
the first brake is disposed between the first shaft and the transmission case;
the second brake is disposed between the second shaft and the transmission case;

the first clutch is disposed between the input shaft and the seventh shaft;

the second clutch is disposed between the third shaft and the fourth shaft;

the third clutch is disposed between the fourth shaft and the fifth shaft; and the fourth clutch is disposed between the fourth shaft and the seventh shaft.

* * * * *